Sept. 15, 1970  D. J. SMITH  3,529,127
WELDING DEVICE
Filed March 2, 1967  3 Sheets-Sheet 2
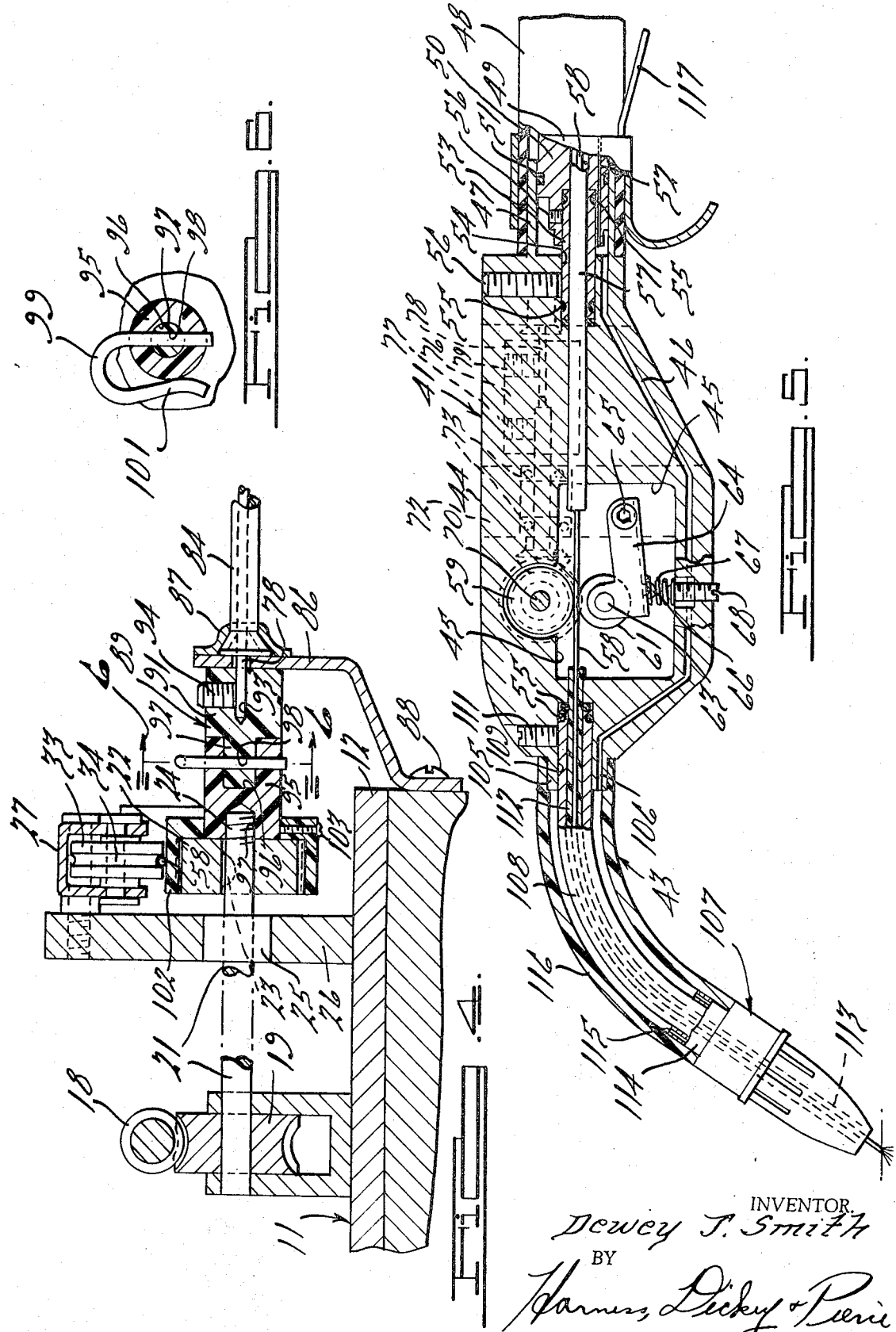
INVENTOR.
Dewey J. Smith
BY
Harness, Dickey & Pierce
ATTORNEYS.

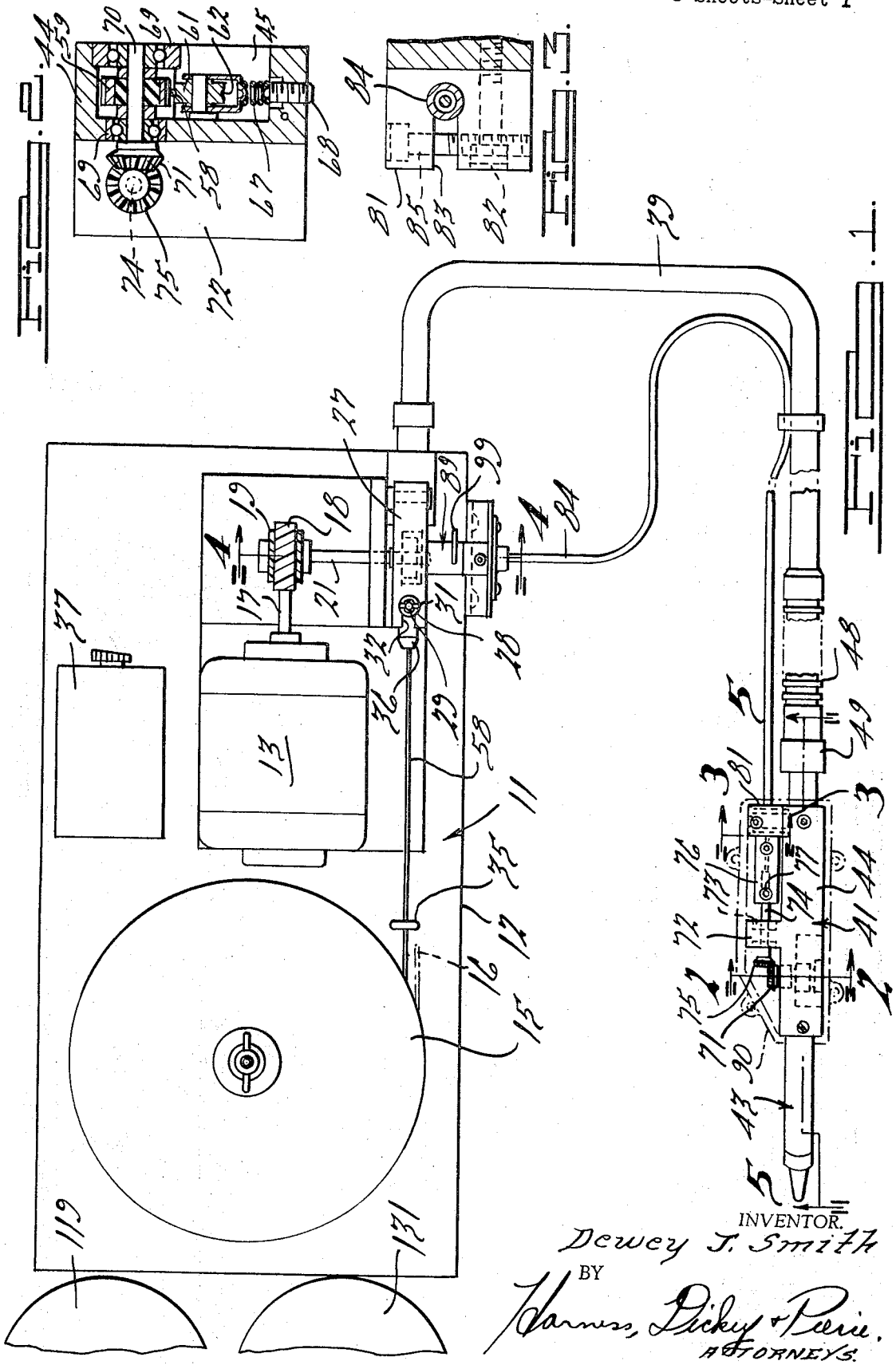

Sept. 15, 1970  D. J. SMITH  3,529,127
WELDING DEVICE
Filed March 2, 1967  3 Sheets-Sheet 3
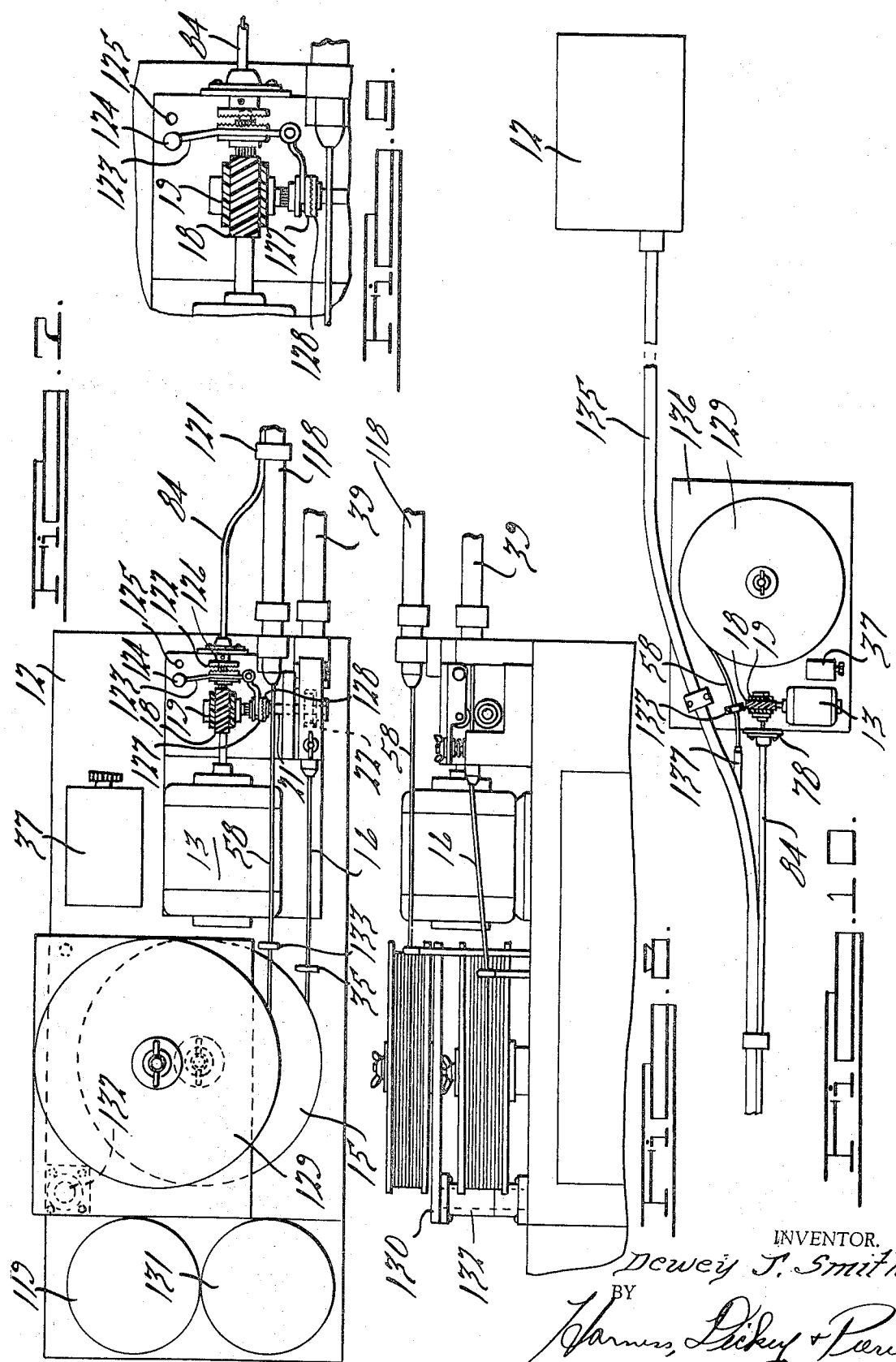
INVENTOR.
Dewey J. Smith
BY
Harness, Dickey & Pierce.
ATTORNEYS.

United States Patent Office 3,529,127
Patented Sept. 15, 1970

3,529,127
WELDING DEVICE
Dewey J. Smith, 8733 Hupp St.,
Warren, Mich. 48089
Filed Mar. 2, 1967, Ser. No. 620,061
Int. Cl. B23k 9/00
U.S. Cl. 219—130     8 Claims

ABSTRACT OF THE DISCLOSURE

Between the welding head and the cable sheath containing supply means for current and gas and the control conductors therefor, a head is inserted having driving means for pulling the welding wire through the cable sheath located directly adjacent to the welding nozzle. The pulling device is driven through a flexible driving element remotely driven from the motor employed for pushing a welding wire through the cable sheath to the welding nozzle. It was found that while the steel type of welding wire could be pushed through the flexible sleeve within the cable sheath, the soft aluminum type of wire could not be successfully pushed and required pulling at a point adjacent to the nozzle.

BACKGROUND OF THE INVENTION

The invention pertains to the feed of a soft welding wire by pulling rather than by pushing it through the cable sheath to the nozzle.

Pulling devices have been employed heretofore for the soft type of welding wire located adjacent to the welding nozzle to which the welding wire and a gas is delivered. The motor for driving the pulling roll was located adjacent to the nozzle as was a one-pound roll of welding wire which made the nozzle heavy and awkward to handle and the driving power was exceedingly limited. Applicant's device readily converts a steel welding unit to a unit for welding aluminum by attaching the push drive motor to a flexible drive element which provides excessive power at a speed controlled by the rheostat of the unit. It is only necessary to connect the flexible drive element by clutch-like means and remove the nozzle and replace it with the pulling device with the nozzle thereon to change the device from one which welds steel to one which welds aluminum.

SUMMARY OF THE INVENTION

The invention converts a welding unit for welding steel to a unit which welds aluminum or provides a unit which welds both steel and aluminum. The nozzle at the end of the supply cable sheath is removed and applied to the pulling head which is secured to the end of the cable sheath in the same manner as the nozzle was attached thereto. A Bowden type of wire drive has the outer casing fixed against rotation at both ends permitting the inner driving wire to be rotated. This is accompanied by the driving shaft of the pushing wheel for the steel welding wire which has a separable connection such as a clutch which when connected pulls the wire when the aluminum welding wire is to be fed. In this arrangement, the attachment at the forward end of the cable sheath pulls the aluminum welding wire from the roll on the unit through the flexible sleeve in the cable sheath and delivers it through the nozzle to the welding end thereof. The cable sheath encloses the welding current conductor, the gas conduit and the control conductors for starting the motor and energizing the transformer when a weld is to be made. When the pulling head is made of metal, the drive is preferably insulated at both ends against the flow of current therethrough. When the head of the pulling device is made of insulating material, the driving wheel and pressure roll is insulated from the shaft or the shaft itself may be made of insulating material to prevent current from passing through the flexible driving head.

BRIEF DESCRIPTION OF THE DRAWINGS

FIG. 1 is a plan view of a welding unit having a pulling head of the present invention applied thereto;

FIG. 2 is an enlarged sectional view of the structure illustrated in FIG. 1, taken on the line 2—2 thereof;

FIG. 3 is an enlarged sectional view of the structure illustrated in FIG. 1, taken on the line 3—3 thereof;

FIG. 4 is a sectional view of the structure illustrated in FIG. 1, taken on the line 4—4 thereof;

FIG. 5 is an enlarged sectional view of the structural illustrated in FIG. 1, taken on the line 5—5 thereof;

FIG. 6 is a sectional view of the structure illustrated in FIG. 4, taken on the line 6—6 thereof;

FIG. 7 is a view of structure, similar to that illustrated in FIG. 6, showing a further form of the invention;

FIG. 8 is a broken view in side elevation of the structure illustrated in FIG. 7;

FIG. 9 is an enlarged view of a portion of the structure illustrated in FIG. 7, showing the drive thereof, and FIG. 10 is a view of structure, similar to that illustrated in FIG. 1, showing a still further form of the invention.

DESCRIPTION OF THE PREFERRED EMBODIMENT

A welding unit 11 of conventional form has a cabinet 12 containing a transformer (not shown) with a drive motor 13 and a spindle 14 for carrying a spool 15 on the top for welding wire 16 which is wound thereon. A shaft 17 of the motor drives a worm 18 which drives a worm wheel 19 and a shaft 21 disposed at right angles to the shaft 17. The shaft 21 has a tooth drive wheel 22 secured in driving relation thereto by a key 23 and retained thereon by a nut on the threaded end 24 of the shaft 21. The shaft has an outboard bearing 25 supported in an upright plate 26 which carries a pivoted lever 27 which is urged downwardly by a spring 28 on a pivoted stud 29 controlled by an adjustable thumb screw 31. A slot 32 in the end of the lever 27 permits the stud 29 to be pivoted from the top of the lever 27 to remove the spring pressure therefrom. The lever 27 supports an idler roller 33 which has an arcuate groove 34 in its face which engages the welding wire 16 and urges it with a predetermined pressure against the teeth of the driven wheel 22 which advances the welding wire from the spool 15. The welding wire is guided through an eye 35 and a sleeve 36 so as to be accurately aligned with the groove 34 in the idler roller 33.

A rheostat 37 is mounted on the top of the cabinet 12 for regulating the speed of the motor 13 so that the welding wire can be driven at a desired speed for a particular weld. In the standard unit the welding wire 16 is of steel and is pushed by the driving tooth wheel 22 through a sleeve in a cable sheath 39 from which it is delivered to a welding nozzle at the end thereof. The cable sheath 39 has a cable which carries current to the wire 16 adjacent to the nozzle and a conduit for delivering gas to the nozzle end. The cable sheath 39 also contains one or more conductors through which the delivery of current to the motor and transformer is controlled from the nozzle end of the cable sheath. A slide valve and switch at the nozzle end of the cable sheath are operated by a trigger mounted thereat.

To the standard unit above described, applicant's invention is applied. This embodies a head 41 which is attached between the end of the cable sheath 39 and the nozzle 43 which is removed from the end to permit the head 41 to be inserted therebetween. The head 41 comprises a casting 44, which may be of metal or plastic material, having a rectangular recess 45 extending inwardly from one side and a gas passageway 46 extending therethrough from one to the other end thereof. The casting 44 has a sleeve 47 on its rear end over which a tubular handle 48 on the end of the cable sheath 39 extends and is secured thereto by a band 49. A body 50 containing a switch and valve (not shown) is carried on the end of the cable sheath 39 and extends into the sleeve 47.

The body 50 is sealed to the sleeve 47 by an O-ring 51 to retain the gas delivered through apertures 52 at the forward end of the body. The gas thus trapped within the sleeve 47 is delivered through the gas passageway 46 to the forward end of the casting 44. A length of copper tube 53 is secured in an aperture in the body 50 and in an aperture 54 in the rear end of the casting, being sealed within the apertures by O-rings 55, and secured therein by set screws 56. The cable sheath 39 has a tube 57 extending throughout the length thereof through which the welding wire 58 is pulled from the spool 15. The tube 57 extends within the recess 45 to deliver the welding wire 58 adjacent to a driven toothed wheel 59 against which it is urged by a roller 61 having arcuate groove 62 therein. The roller is supported on a pin 63 extending through a channel shaped lever 64 which is secured by a pivot 65 to the wall of the recess 45. A nib 66 on the bottom of the lever receives one end of a spring 67 which is tensioned by the adjustment of a screw 68.

Above the recess 45, a shaft 70 is journaled in roller bearings 69 at opposite ends thereof. The toothed wheel 59 is fixed to the shaft between the bearings. The shaft 70 extends beyond the casting 44 and has a bevel gear 71 fixed thereto. An extension 72 on the casting has a pair of aligned bearings 73 therein for supporting a shaft 74 to which a bevel gear 75 is secured having teeth which mates with the teeth of the bevel gear 71. The shaft 74 has a cylindrical insulating connector 76 secured thereto by a set screw 77. The opposite end of the connector 76 has a driving wire 78 secured thereto by a set screw 79. An insulating block 81 secured by screws 82 to the casting 44 has a slotted aperture 83 which grips a driving wire casing 84 when being clamped in firm fixed relation therein by a screw 85. The casing 84 and wire 78 are substantially the length of the cable sheath 49 with the opposite end of the casing fixed to a bracket 86 by a plate 87 to secure it against rotation when the wire 78 is rotated. The bracket 86 is secured to the cabinet 12 by a plurality of screws 88 with the driving wire 78 disposed on the center line of the shaft 21. A separable insulating driving coupling 89 connects the wire 78 to the shaft 21, as clearly illustrated in FIG. 4. The coupling 89 has a cylindrical driven section 91 provided with a reduced cylindrical extension 92 on one end and an aperture 93 on the other end for receiving the end of the wire 78 which is fixed thereto by a set screw 94. A driving section 95 has a cylindrical aperture 96 at one end for receiving the extension 92 and a threaded aperture 97 on the opposite end which is screwed on the threaded end 24 of the shaft 21 in fixed driving relation thereto in place of the nut normally provided thereon. An aperture 98 extends through the wall of the recess 96 and the extension 92 for receiving a coupling pin 99 having a locking arm 101 thereon. Upon removing the pin 99 the welding unit may be used for normal welding of steel by having the welding wire advanced by the wheel 22.

When the device of the present invention is to be employed for pulling the aluminum or soft welding wire at the nozzle end, the pin 99 is inserted through the aperture 98 to produce a drive from the shaft 21 to the wheel 59 of the casting 44. When this occurs, the spring tension is removed from the lever 27 so as to have the pressure wheel 33 out of engagement with the wire 16 to prevent the advancement thereof. When the peripheral speed of the wheel 22 is the same as that of the soft welding wire 58, the movement of the wire with the teeth of the wheel will not damage the wire in any manner. However, when the speeds are different a sleeve 102 may be placed over the section 95 and the teeth of the wheel 22 to be secured in position by a screw 103. When a 1:1 ratio is provided for the bevel gears 71 and 75, the speed of driving the wheel 59 will produce a pull on the wire 58 at a speed which will equal the peripheral speed of the tooth wheel 22 and the sleeve 102 need not be employed. The speed of the motor is adjusted through the rheostat 37, the speed of the shaft 21 and the wire 78 will be the same, either reduced or increased by the adjustment, whichever is desired.

The forward end of the casting 44 has a sleeve 105 extending forwardly thereof through which the gas in the passageway 46 is delivered through one or more apertures 106. A welding nozzle 107 of conventional form, has a conducting arcuate portion 108 which extends into an aperture 109 in the forward casting portion where it is sealed by O-rings 55 at the end and the peripheral wall thereof. The end of the arcuate portion 108 is secured in the aperture 109 by a set screw 111. A plastic tube of nylon, Delrin, Teflon or the like, is provided within the arcuate conducting portion 108 for protecting the welding wire 58 as it is pushed beyond the wheel 59 through the nozzle to the welding tip 113. About the forward end of the conducting portion 108, a tube 114 is provided having passageways 115 for the gas which is conducted thereto through a sleeve 116 sealed to the sleeve 105 and tube 114. An operating trigger 117 is mounted on the handle 48 which when actuated, closes the switch and opens the valve for producing a flow of current to the transformer and motor 13 and a flow of gas through the body 50. The current is conducted to the body the same as the gas and energizes the welding wire 58 with the amount of welding current desired. When the casting 44 is made of metal, the current will also flow therethrough and for this reason the flexible driving element is provided with the insulating connector 76 and insulating block 81 and also the insulating driving element 89 to prevent the current from passing to the cabinet or from the cabinet to the welding head. A thin two-piece plaster cover 90 shown in dot dash line may be used to insulate the metal casting. As pointed out above, when the casting is made of plastic material, it is only necessary to insulate the wheel 59 from the shaft 70 in a known manner either by providing an insulating hub to the wheel or employ a shaft 70 made of insulating material.

The welding head and the drive therefor is capable of readily changing a standard unit for welding steel to one which is capable of welding aluminum or other material requiring a soft welding wire. It is within the purview of the present invention to utilize two cables and two spools of wire, one mounted adjacent to or above the other so that the hard wire may be pushed and the soft wire may be pulled to deliver it to the nozzle end. In this arrangement the head 41 would be a permanent part of a second cable sheath and would only require the clutching of one drive and the declutching of the other to employ the unit for the soft wire welding or the hard wire welding.

Such an arrangement is illustrated in FIGS. 7 to 9 inclusive wherein the unit 11 comprises the cabinet 12 which supports the motor 13 for driving a worm 18 and worm wheel 19, the latter of which drives the shaft and the tooth wheel 22 for driving the wire 16 from the spool 15 thtrough the guiding sleeve within the cable sheath 39. A second cable sheath 118 is attached to the cabinet 12 and connected to the transformer and the argon or other gas in a container 119. The conductors from the switch in the cable casing to the transformer and motor are connected parallel with those within the cable sheath 39. The cable sheath 118 has the head 41 of FIG. 5 added thereto with the pulling wheel 59 driven from the drive wire 78 within the casing 84. The casing is secured by a clip 121 to the cable sheath 118 to keep it straight and prevent it from winding up.

The wire 78 within the casing 84 is connected to a clutch plate 122 which is driven by the worm 18 when the operating lever 123 has been shifted clockwise after the spring pressed handle 124 has been raised to move an extending pin thereon from one aperture into the aperture 125. This moves the driving plate 126 of the clutch into engagement with the clutch plate 122. A direct drive is established from the motor through the worm 18 to the bevel gear 75 on the opposite end of the wire for driving the bevel gear 71 carried on the head 41. The movement of the operating lever 123 clockwise moved a driving clutch plate 127 from engagement with a clutch plate 128 to interrupt the drive for the tooth wheel 22 so that the wire 16 will no longer be fed through the cable sheath 39. The soft wire 58 from a spool 129 will be pulled through the wire guiding sleeve within the cable sheath 118 by the tooth wheel 159 of the head 41. When the operating lever 123 is moved counterclockwise, returning the pin on the handle 124 from the aperture 125 to the aperture initially engaged, the welding nozzle on the end of the cable sheath 39 can be used and the wire 58 will not be drawn through the cable sheath 118 as the driving clutch plate 127 will be disconnected.

The gas for the nozzle on the end of the cable sheath 39 is usually carbondioxide supplied in a container 131 which is located adjacent to the container 119, both of which are connected directly to the respective cable sheaths. A spool 129 is herein illustrated as being mounted on a platform above the spool 15 on a pivot support 132 which permits the platform and spool to be swung out from over the spool 15 to permit the spool to be changed. The wire 58 is pulled from the spool 129 through an eye 133 to align the wire with the cable sheath 118 into which it is drawn. With this arrangement the welding unit is immediately available for using the steel wire 16 for steel welding or the soft aluminum wire 58 for aluminum welding. It is only necessary to shift the clutch lever 123 from one to the other positions to weld steel or aluminum, as the trigger on either of the welding nozzles will produce energization of the transformer and motor 13 as well as the gas supply for the respective nozzles.

A further form of the invention is illustrated in FIG. 10 that wherein a cabinet 12 of conventional construction has a substantial length of the cable sheath 135 mounted thereon, it was found that this length of casing put too great a strain on the soft welding wire 58. The spool 129 is carried on a separate platform or cabinet 136 so that the wire can be fed into a sleeve 137 within the cable sheath 135 closely adjacent to the pulling head 41. With this arrangement the motor 13 on the cabinet 136 drives through the worm 18 and worm wheel 19 to drive the wire 58 through the casing 84. All of the current and gas is supplied from the cabinet 12 and the rheostat for controlling the speed of the motor 13 is preferably mounted on the cabinet 136. The current, gas and motor are controlled by the trigger 117 at the end of the cable sheath 135.

What is claimed is:

1. A head for supporting a nozzle on the end of a sheath through which a welding wire, electric cable and a gas conduit extends, a pulling wheel and pressure roller for a welding wire carried by the head, drive means for said pulling wheel which is insulated therefrom, said wire being drawn from said sheath through said head and wheel and advanced through said nozzle, and means for conductivity connecting said electric cable to the welding wire in said nozzle, said head having a passageway from the sheath end thereof to said nozzle end which bypasses said wheel for conducting a gas directly from said sheath to said nozzle.

2. In a welding head as recited in claim 1, wherein the drive means embodies a flexible drive member having an inner driving element and an outer casing, and means for insulating said inner driving element and casing from said pulling wheel.

3. In a welding head as recited in claim 1, wherein the nozzle is of arcuate shape from end to end through which the welding wire is advanced, and an arcuate length of tube about said nozzle sealed to said head in the area of said passageway which delivers gas from said sleeve and head to the remote end of said nozzle.

4. In a welding head as recited in claim 2, wherein the flexible drive means has means for interrupting the drive from said motor.

5. In a welding head as recited in claim 1, wherein the head is made of insulating material.

6. In a welding unit embodying a welding cable sheath having a welding nozzle on the end, a motor on said unit, drive means operated by said motor for pushing a welding wire through the cable sheath to said nozzle, a head mountable between the nozzle and cable sheath having pulling means for the welding wire thereon, and flexible drive means for said pulling means driven by said motor when the first said drive means is rendered inoperative.

7. In a welding unit having a welding cable sheath containing a current cable, a gas conduit and a welding wire sleeve with a nozzle on the end thereof, a motor on said unit, drive means operated by the motor for pushing a welding wire through the sleeve in the cable sheath to the nozzle, a similar cable sheath having a driving head on the end remote from the unit, a nozzle on said head, drive means on said head for pulling a welding wire through the sleeve of the cable sheath, a flexible drive means supported by said head and said unit, and clutch means for connecting the motor to said flexible drive means while disconnecting the drive for pushing the wire through the first said cable sheath.

8. In a welding unit as recited in claim 7, wherein control means are provided operated by a trigger adjacent to the nozzle end of the cable sheaths for producing a flow of current and the respective gas for each said nozzle.

References Cited
UNITED STATES PATENTS

| | | | |
|---|---|---|---|
| 2,040,030 | 5/1936 | Snyder et al. | 314—68 X |
| 2,808,498 | 10/1957 | Hudson et al. | 219—130 |
| 3,098,892 | 7/1963 | Spade et al. | 219—136 X |
| 3,196,249 | 7/1965 | Thostrup | 219—130 |
| 3,248,516 | 4/1966 | Gilliland | 219—130 |
| 3,283,121 | 11/1966 | Bernard et al. | 219—130 |
| 3,293,477 | 12/1966 | Lobosco | 314—69 |

ANTHONY BARTIS, Primary Examiner

C. L. ALBRITTON, Assistant Examiner

U.S. Cl. X.R.
219—131; 314—68